June 21, 1955  D. C. SPENCER ET AL  2,711,452
DRAW-OUT SWITCHGEAR APPARATUS
Filed July 28, 1951  5 Sheets-Sheet 1

INVENTORS
Douglas C. Spencer
and Roy S. Tusing.
BY
ATTORNEY

June 21, 1955
D. C. SPENCER ET AL
2,711,452
DRAW-OUT SWITCHGEAR APPARATUS
Filed July 28, 1951
5 Sheets-Sheet 3
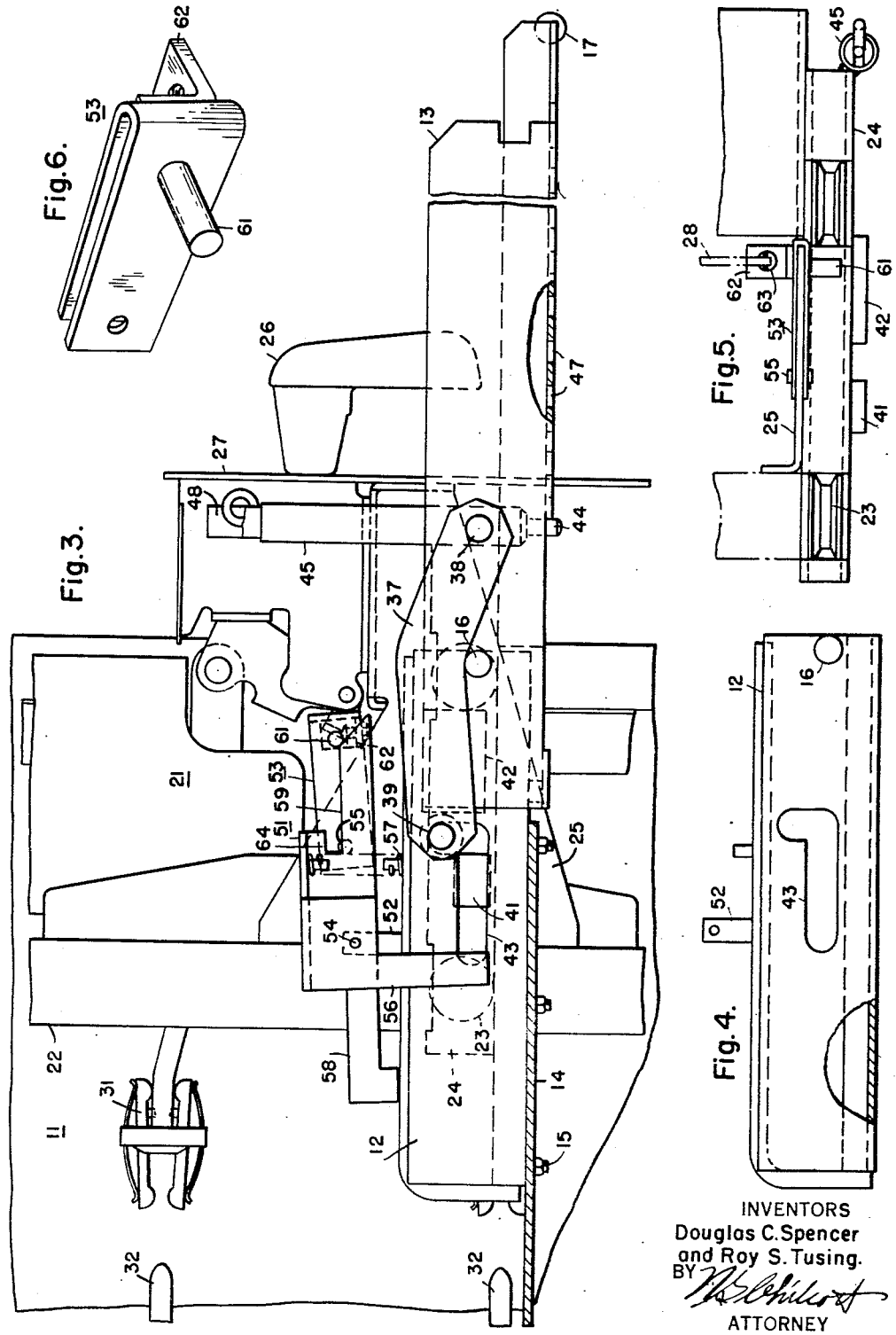
INVENTORS
Douglas C. Spencer
and Roy S. Tusing.
BY
ATTORNEY

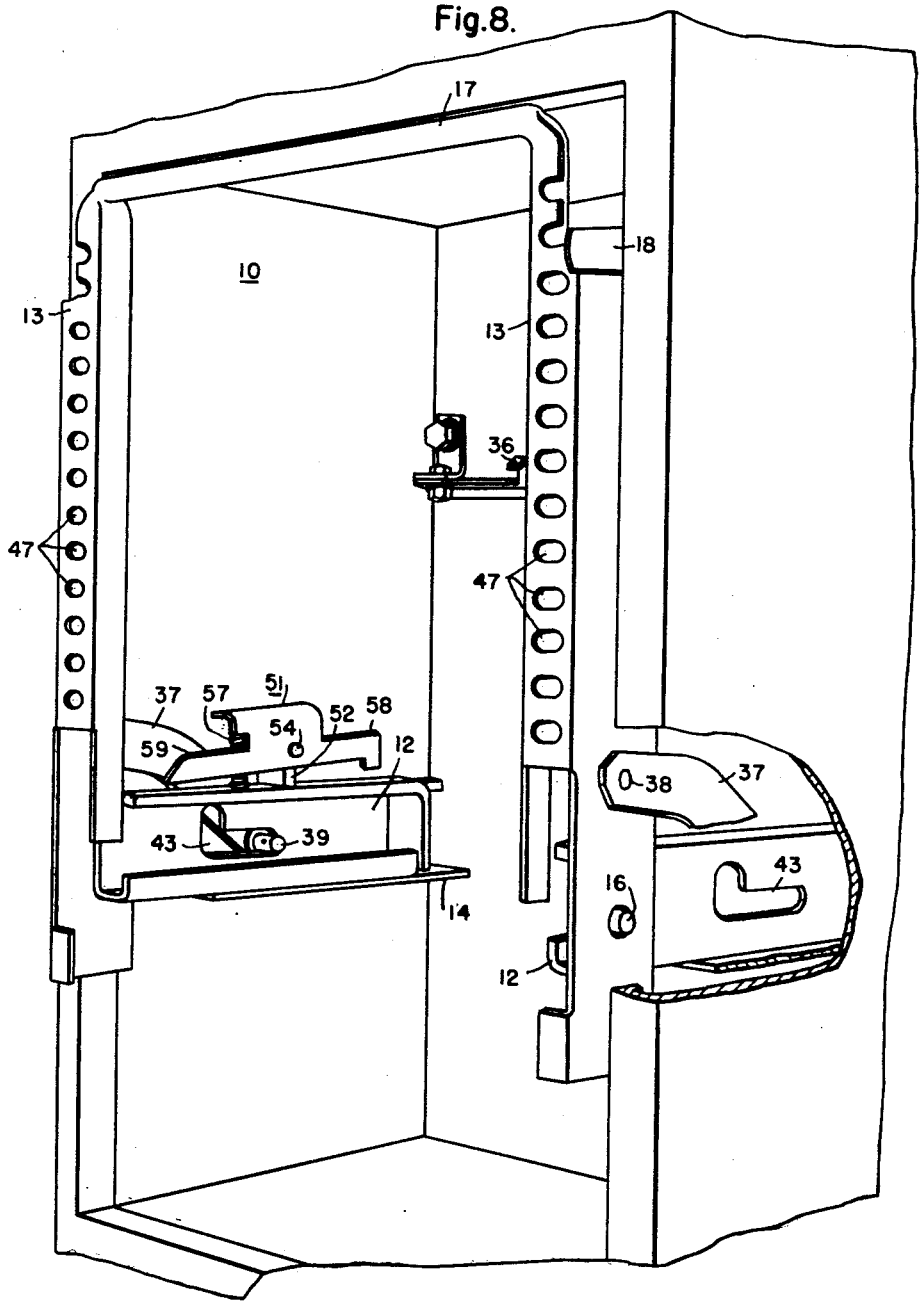

United States Patent Office 2,711,452
Patented June 21, 1955

2,711,452

DRAW-OUT SWITCHGEAR APPARATUS

Douglas C. Spencer, Pittsburgh, and Roy S. Tusing, East Pittsburgh, Pa., assignors to Westinghouse Electric Corporation, East Pittsburgh, Pa., a corporation of Pennsylvania Application July 28, 1951, Serial No. 239,134

20 Claims. (Cl. 200—50)

Our invention relates, generally, to switchgear apparatus and, more particularly, to metal-enclosed switchgear of the horizontal drawout type.

When switchgear of the drawout type is installed in locations subject to movement or shock forces, such, for example, as on a ship or other vehicle, it is essential that the drawout units, such as circuit breakers, cannot be displaced by vibration or by rolling or pitching of the equipment. It is also essential that the apparatus be capable of withstanding severe shocks. Furthermore, rapid removal of the drawout units from their cells should be made possible and the operation of the drawout mechanism should be simplified as much as possible.

An object of our invention, generally stated, is to provide metal-enclosed switchgear which shall be simple and efficient in operation and which may be economically manufactured and installed.

A more specific object of our invention is to provide for holding a drawout switchgear unit at any position during its movement into or out of the enclosing cell.

Another object of our invention is to operate the drawout mechanism by means of rail extensions which support the breaker unit in front of the cell.

A further object of our invention is to provide mechanical interlocking between the drawout mechanism and the circuit breaker mechanism to prevent improper operation of the mechanisms.

Another object of our invention is to prevent shocks from causing improper operation of the breaker mechanism.

Other objects of our invention will be explained fully hereinafter or will be apparent to those skilled in the art.

In accordance with one embodiment of our invention, a removable circuit breaker unit is moved between predetermined positions in a cell by hinged rail extensions connected to the breaker unit by links which are automatically disengaged from the breaker unit when the rail extensions are lowered to the horizontal position. The breaker unit may be moved further on the rail extensions only by disengaging latch members which automatically engage notches in the rails. Mechanical interlocking is provided for preventing a closed circuit breaker from being moved into or out of the operating position in the cell.

For a better understanding of the nature and objects of our invention, reference may be had to the following detailed description, taken in conjunction with the accompanying drawings, in which:

Fig. 3 is a view, similar to Fig. 2, the breaker unit being in a disconnected position;

Fig. 4 is a detail view, in side elevation, of the fixed portion of one of the rails for supporting the breaker unit in the cell;

Fig. 5 is a view, in plan, of part of the truck carriage for the circuit breaker;

Fig. 6 is a view, in perspective of one of the interlocking members;

Fig. 8 is a view, in perspective, of the cell, the breaker unit being removed from the cell.

Figure 1:
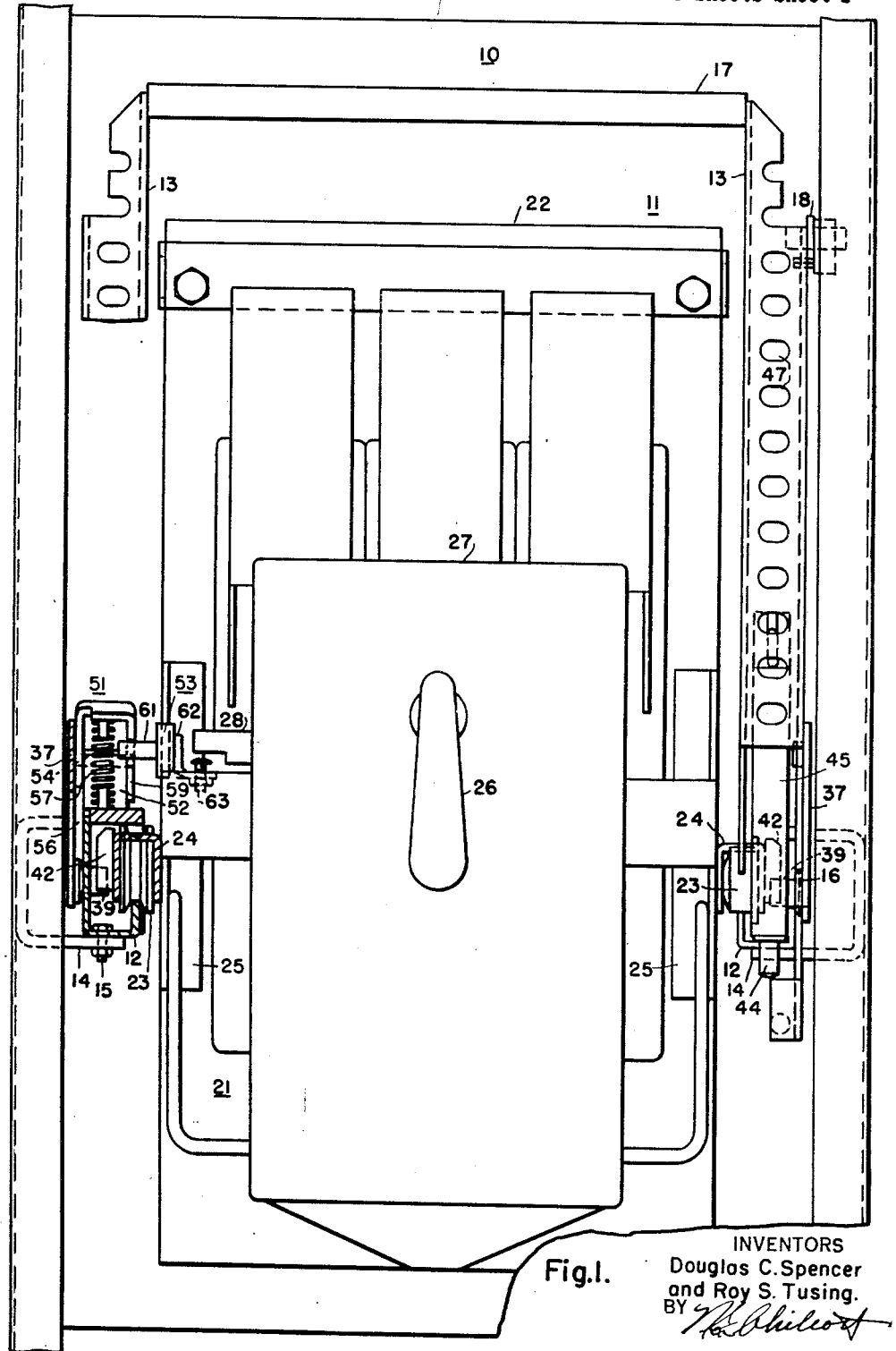
Figure 1 is a view, partly in front elevation and partly in section, of a portion of a switchgear structure embodying the principal features of the invention.

Referring to the drawings, and particularly to Fig. 1, the structure shown therein comprises a portion of a cell 10 which may be of the usual metal-enclosed type suitable for housing a removable circuit breaker unit 11 which is mounted in the cell on an extensible track having a fixed portion 12 and a hinged portion 13 disposed at each side of the cell 10. As shown most clearly in Figs. 1 and 3, the fixed portions 12 of the track may be bolted to U-shaped brackets 14 by bolts 15. The brackets 14 may be welded to the sides of the cell 10.

As also shown in Figs. 1 and 8, the hinged portions 13 are pivotally attached to the fixed portions 12 by pins 16 which extend outwardly through the hinged portions 13 for a purpose which will be explained hereinafter. The outer ends of the hinged portions 13 are joined by a tie-bar 17 which may be used as a handle to actuate the track and mechanism. The hinged portions 13 may be lowered from the vertical position shown in Figs. 2 and 8 to the horizontal position shown in Figs. 3 and 7. A latch member 18 is provided at the upper right-hand corner of the cell 10 for engaging one of the extension rails 13 to retain the rails in the vertical position.

The circuit breaker unit 11 is of the drawout type and comprises a circuit breaker mechanism 21 which is mounted on a panel 22. The circuit breaker unit is supported by rollers 23 which run on the track 12. The rollers 23 are disposed in U-shaped members 24 which are attached to triangular-shaped side members 25 which, in turn, are attached to the panel 22. The circuit breaker mechanism may be operated in the usual manner by means of a handle 26 which extends from a face plate 27 at the front of the circuit breaker. A trip bar 28 is provided for tripping the circuit breaker mechanism as will be explained more fully hereinafter.

Figure 2:
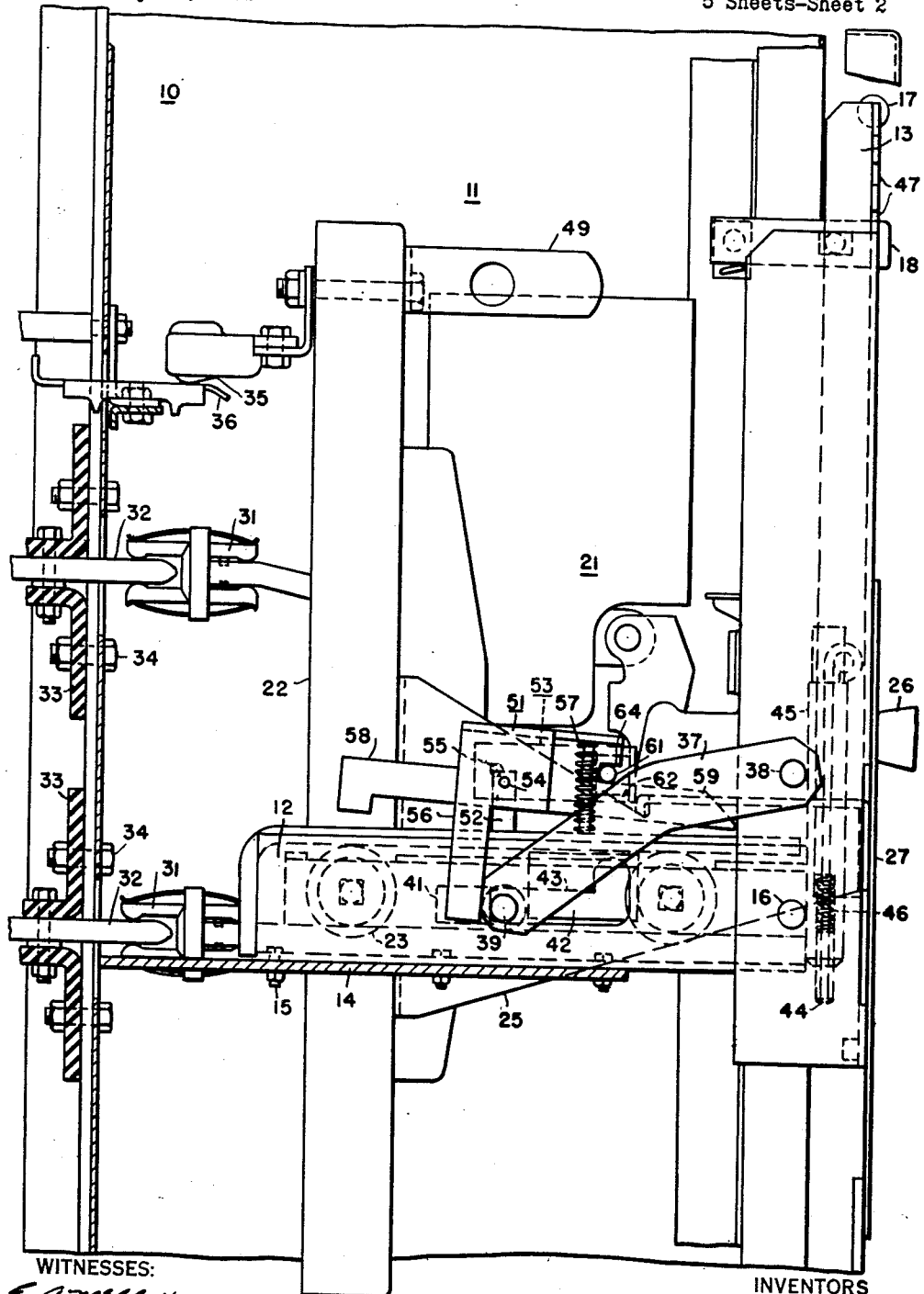
Fig. 2 is a view, partly in side elevation and partly in section, of the structure shown in Fig. 1, the circuit breaker unit being in the connected or operating position.

As shown most clearly in Fig. 2, the circuit breaker unit 11 is provided with primary disconnecting contact members 31 which engage fixed contact members 32 at the rear of the cell 10 when the circuit breaker unit is fully inserted into the cell and is in the operating or connected position. The contact members 31 are carried by the circuit breaker unit and the contact members 32 are supported by insulating members 33 which may be attached to the rear of the cell 10 by bolts 34.

The circuit breaker unit 11 is also provided with secondary disconnecting contact members 35 which engage fixed secondary contact members 36 at the rear of the cell 10 when the breaker unit is in the operating position. When the breaker unit is in the disconnected position, as shown in Fig. 3, the primary disconnecting contact members 31 are disengaged from the contact members 32.

In the present case, the secondary disconnecting contact members 35 are also disengaged from the contact members 36 when the breaker unit is in the position shown in Fig. 3. However, if desired, the secondary disconnecting contact members could be so arranged that they would remain engaged when the breaker unit is in the position shown in Fig. 3, thereby providing what is generally known as a "test" position for the circuit breaker unit. In that case, the secondary contact members would be disengaged when the breaker unit is moved out of the cell onto the extension rails 13.

In order to provide for automatically withdrawing the circuit breaker unit 11 from the position shown in Fig. 2 to the position shown in Fig. 3 when the rail extensions 13 are lowered from the vertical to the horizontal position, a link 37 is pivotally connected to each rail extension 13 by a pin 38. Each link 37 has an inwardly extending pin 39 in the opposite end of the link from the end containing the pin 38. As shown most clearly in Figs. 2, 3 and 5, spaced blocks 41 and 42 are secured to the U-shaped members 24 at the sides of the breaker unit. The block 42 is higher than the block 41.

As shown in Fig. 2, the pin 39 is disposed between the blocks 41 and 42 when the extension rails 13 are in the vertical position. Thus, when the rails 13 are lowered toward the horizontal position, the pins 39 which extend through L-shaped slots 43 in the rails 12, engage the blocks 42 to withdraw the circuit breaker unit 11. This mechanism makes for very easy operation, since the tie-bar or operating handle 17 is at the outer ends of the rail extensions 13 and utilizes the rails as a long lever for moving the breaker over that portion of its travel where the resistance of the contacts must be overcome.

As shown in Fig. 3, when the extension rails 13 are in the horizontal position, the links 37 are engaged by the pins 16 to raise the pins 39 into the uppermost portion of the slots 43 above the blocks 41. Thus, the blocks 41 are free to pass under the pins 39 as the circuit breaker unit is withdrawn further.

Figure 7:
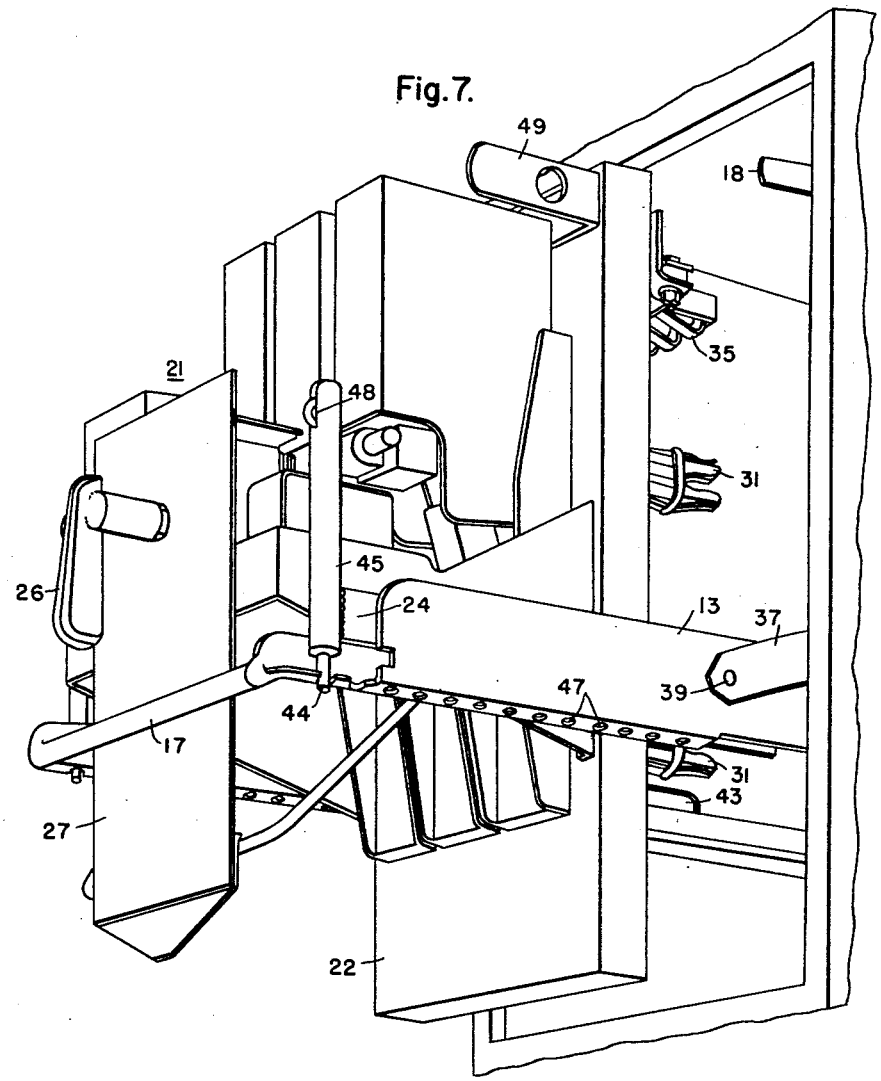
Fig. 7 is a view, in perspective, of a portion of the switchgear structure, the circuit breaker unit being in the extended position.

In order to retain control of the circuit breaker unit as it is being further withdrawn, latching pins 44 are disposed in cylindrical handles 45 which may be welded to the ends of the U-shaped members 24 as shown most clearly in Figs. 5 and 7. The pins 44 are biased downwardly by springs 46 disposed inside of the cylindrical handles 45. The lower ends of the pins 44 enter spaced notches 47 provided in the rail extensions 13 unless the pins are raised by pushing upwardly on the upper ends of the pins which are disposed in slots 48 in the handles 45.

Thus, the circuit breaker unit may be moved further outwardly on the rail extensions 13 by the operator grasping one of the handles 45 with each hand and pushing upwardly on the pins 44 with his thumbs, thereby releasing the pins from the notches 47. If the handles 45 and the pins 44 are released by the operator, the pins will enter one of the slots 47, thereby stopping further movement of the breaker unit. As shown in Fig. 7, the outward movement of the breaker unit on the extension rails 13 is limited by the tie-bar 17. If it is desired to remove the breaker unit from the extension rails, it may be lifted by means of a hoist attached to a lifting bracket 49 which is attached to the panel 22.

It will be understood that the pins 44 must be held in their raised position when the breaker unit is being moved inwardly on the extension rails 13. When the breaker unit is moved inwardly to the position shown in Fig. 3, the blocks 42 engage the pins 39 in the links 37 to stop the inward movement. Further movement is obtained by raising the rails 13 which causes the pins 39 to be lowered in the slots 43 to engage the blocks 41, thereby pushing the breaker unit into the cell.

As previously stated, when the breaker unit is fully inserted into the cell, the extension rails 13 are in their vertical position and they may be latched in this position by means of the latch 18, thereby retaining the breaker unit in the operating position. In this manner, full and positive control of the breaker unit is obtained throughout its range of travel on the rails and the possibility of the breaker unit becoming displaced is precluded.

In order to prevent a closed-circuit breaker from being moved into or out of the connected position, a mechanical interlocking means is provided. The mechanical interlocking means comprises an interlocking plate 51, which is pivotally mounted on an upwardly extending member 52 on the left-hand rail 12, and a tripping member 53 which is pivotally attached to the left-hand side member 25. The interlocking plate 51 may be attached to the member 52 by a pin 54. The tripping member 53 may be attached to the side member 25 by a pin 55.

As shown most clearly in Fig. 2, the interlocking plate 51 has a downwardly extending arm 56 which is engaged by one of the links 37 when the breaker unit is in the operating position. Thus, the interlocking plate is actuated about its pivot pin 54 to compress a spring 57, which is disposed between the top of the rail 12 and a laterally extending portion of the interlocking plate 51.

As also shown in Figs. 2, 3 and 8, the interlocking plate 51 is provided with oppositely disposed horizontally extending arms 58 and 59. As shown most clearly in Figs. 5 and 6, the tripping member 53 is provided with a pin 61 which extends horizontally from one side of the tripping member 53 and an angle-shaped bracket 62 which extends horizontally from the other side of the tripping member 53. An adjustable screw 63 is disposed in the bracket 62.

As shown in Fig. 2, the pin 61 is disposed in a notch 64 in the interlocking plate 51 when the breaker unit is in the operating position. Thus, the tripping member 53 is prevented from bouncing upwardly as a result of shocks on the breaker unit which might accidentally cause tripping of the circuit breaker by the screw 63 raising the trip bar 28. When the pin 61 is in the position shown in Fig. 2, the breaker may be closed in the usual manner.

When the breaker unit is moved outwardly by lowering the extension rails 13, the arm 56 of the interlocking plate 51 is disengaged from the link 37, thereby permitting the spring 57 to actuate the interlocking plate 51 about its pivot pin 54 to cause the arm 59 to raise the pin 61 and the tripping member 53 to cause the screw 63 to raise the trip bar 28, thereby tripping the circuit breaker before the primary disconnecting contact members 31 are disengaged from the contact members 32. The arm 59 continues to hold the pin 61 in its raised position until the breaker has reached its disconnected position shown in Fig. 3, thereby making the circuit breaker trip free during its travel from the connected to the disconnected position. The movement of the interlocking plate 51 about its pivot pin 54 by the action of the spring 57 is limited by the arm 58 which engages the top of the rail 12.

As shown in Fig. 3, the pin 61 engages the arm 59 as the breaker unit is moved inwardly, thereby causing the circuit breaker to be tripped in the event that it is closed when it reaches the position shown in Fig. 3. The breaker must remain tripped until the arm 56 is engaged by the link 37 to actuate the interlocking plate 51 to the position shown in Fig. 2 which lowers the pin 61 and the tripping member 53, thereby disengaging the screw 63 from the trip bar 28 to permit the circuit breaker to be closed. As previously explained, the pin 61 is disposed in the notch 64, thereby preventing accidental tripping of the breaker unit while it is in its operating position.

From the foregoing description, it is apparent that we have provided for easily moving a circuit breaker unit between predetermined positions in a cell by merely lowering hinged rail extensions which support the breaker unit. The levering mechanism is automatically disconnected from the circuit breaker unit when the rail extensions are in their horizontal position. Further movement of the circuit breaker unit is controlled by spring biased latching members which must be manually released to permit further movement of the breaker unit. Mechanical interlocking is provided to prevent a closed-circuit breaker from being moved into or out of the operating position. Accidental tripping of the circuit breaker by shock when in its operating position is precluded. Furthermore, the breaker unit may be moved out of the cell as rapidly as desired by manually retaining the latching members in their released position.

Since numerous changes may be made in the above described construction and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. In switchgear apparatus, in combination, a cell, a track having a fixed portion horizontally disposed in the cell and a hinged portion movable about a hinge pin between vertical and horizontal positions, a circuit breaker unit mounted on the track and movable horizontally into or out of the cell, and actuating mechanism connected to the hinged portion of the track and releasably engaging the breaker unit to move it in either direction between predetermined positions.

2. In switchgear apparatus, in combination, a cell, a track having a fixed portion horizontally disposed in the cell and a hinged portion movable about a hinge pin between vertical and horizontal positions, a circuit breaker unit mounted on the track, and link means connected to the hinged portion of the track for moving the breaker unit between predetermined positions, said link means being automatically disengaged from the breaker unit at one position of the breaker unit.

3. In switchgear apparatus, in combination, a cell, a track having a fixed portion horizontally disposed in the cell and a hinged portion movable about a hinge pin between vertical and horizontal positions, a circuit breaker unit mounted on the track and movable horizontally into or out of the cell, mechanism connected to the hinged portion of the track for moving the breaker unit in either direction between predetermined positions, said mechanism being automatically disengaged from the breaker unit when the hinged portion of the track is actuated to the horizontal position.

4. In a switchgear apparatus, in combination, a cell, a track having a fixed portion horizontally disposed in the cell and a hinged portion movable about a hinge pin between vertical and horizontal positions, a circuit breaker unit mounted on the track and movable horizontally into or out of the cell, mechanism connected to the hinged portion of the track for moving the breaker unit in either direction between predetermined positions, and stop means in the cell for disengaging the said mechanism from the breaker unit at one position of the breaker unit.

5. In switchgear apparatus, in combination, a cell, a track having a fixed portion horizontally disposed in the cell and a hinged portion movable about a hinge pin between vertical and horizontal positions, a circuit breaker unit mounted on the track and movable horizontally into or out of the cell, and link means connected to the hinged portion of the track for moving the breaker unit between predetermined positions, said link means being automatically disengaged from the breaker unit by the hinge pin for the track when the hinged portion of the track is in the horizontal position.

6. In switchgear apparatus, in combination, a cell, a track having a fixed portion horizontally disposed at each side of the cell and extensible portions extending outside of the cell and hinged to the fixed portions, said extensible portions having a series of spaced stop means thereon, a circuit breaker unit movably mounted on the track, releasable latch means disposed on the breaker unit to engage said stop means successively to control the movement of the breaker unit on the track, and a tie bar connecting the outer ends of the extensible portions, said tie bar limiting the outward movement of the breaker unit on the track.

7. In switchgear apparatus, in combination, a cell, a track having a fixed portion horizontally disposed at each side of the cell and extensible portions extending outside of the cell, said extensible portions having a series of spaced stop means thereon, a circuit breaker unit movably mounted on the track, spring-biased latch means disposed on the breaker unit to engage said stop means successively to control the movement of the breaker unit on the track, and a tie bar connecting the outer ends of the extensible portions, said tie bar limiting the outward movement of the breaker unit on the track.

8. In switchgear apparatus, in combination, a cell, a track having a fixed portion horizontally disposed at each side of the cell and extensible portions extending outside of the cell and hinged to the fixed portions, said extensible portions having a series of spaced stop means thereon, a circuit breaker unit movably mounted on the track, manually releasable latch means disposed on the breaker unit to engage said stop means successively to control the movement of the breaker unit on the track, and a tie bar connecting the outer ends of the extensible portions, said tie bar limiting the outward movement of the breaker unit on the track.

9. In switchgear apparatus, in combination, a cell, a track having a fixed portion horizontally disposed at each side of the cell and extensible portions extending outside of the cell, said extensible portions having a series of spaced notches therein, a circuit breaker unit movably mounted on the track, a manually releasable latch attached to the breaker unit and disposed to enter said notches successively to control the movement of the breaker unit on the track, and a tie bar connecting the outer ends of the extensible portions, said tie bar limiting the outward movement of the breaker unit on the track.

10. In switchgear apparatus, in combination, a cell, a track having a fixed portion horizontally disposed in the cell and an extensible portion extending outside of the cell, said extensible portion having a series of spaced notches therein, a circuit breaker unit movably mounted on the track, a vertically disposed handle secured to the breaker unit for moving the unit horizontally, and a manually releasable latch disposed in the handle to enter said notches successively to control the horizontal movement of the breaker unit on the track.

11. In switchgear apparatus, in combination, a cell, rails secured to the sides of the cell, a hinged extension for each rail, at least one of said rail extensions having a plurality of spaced notches therein, a circuit breaker unit mounted on the rails, actuating mechanism connected to the rail extensions for moving the breaker unit between predetermined positions by actuating the extensions about their hinge points, said actuating mechanism being automatically disengaged from the breaker unit at one position of the breaker unit, and releasable latch means disposed to enter said notches to control the movement of the breaker unit on said extensions only after the disengagement of the actuating mechanism from the breaker unit.

12. In switchgear apparatus, in combination, a cell, rails secured to the sides of the cell, a hinged extension for each rail, said rail extensions having a plurality of spaced notches therein, a circuit breaker unit mounted on the rails, link means connected to the rail extensions for moving the breaker unit between predetermined positions by actuating the extensions about their hinge points, said link means being automatically disengaged from the breaker unit at one position of the breaker unit, and spring-biased manually releasable latch means disposed to enter said notches to control the movement of the breaker unit on said extensions only after the disengagement of the links from the breaker unit.

13. In switchgear apparatus, in combination, a cell, rails secured to the sides of the cell, hinged extensions for the rails movable between vertical and horizontal positions, said rail extensions having a plurality of spaced notches therein, a circuit breaker unit mounted on the rails, link means connected to the rail extensions for moving the breaker unit between predetermined positions by actuating the extensions about their hinge points, said link means being automatically disengaged from the breaker unit when the rail extensions are lowered to the horizontal position, and releasable latch means disposed on the breaker unit to enter said notches to control the movement of the breaker unit only when it is disengaged from the links.

14. In switchgear apparatus, in combination, a cell, rails secured to the sides of the cell, hinged extensions for the rails movable between vertical and horizontal positions, said rail extensions having a plurality of spaced notches therein, a circuit breaker unit mounted on the rails, link means connected to the rail extensions for moving the breaker unit between predetermined positions by actuating the extensions about their hinge points, said link means being automatically disengaged from the breaker unit when the rail extensions are lowered to the horizontal position, handles secured to the breaker unit for manually moving it on the rail extensions, and releasable latch means associated with the handles and disposed to enter said notches to control the movement of the breaker unit only when it is disengaged from the links.

15. In switchgear apparatus, in combination, a cell, rails secured to the sides of the cell, hinged extensions for the rails movable between vertical and horizontal positions, said rail extensions having a plurality of spaced notches therein, a circuit breaker unit mounted on the rails, link means connected to the rail extensions for moving the breaker unit between predetermined positions by actuating the extensions between vertical and horizontal positions, said link means being automatically disengaged from the breaker unit when the rail extensions are lowered to the horizontal position, handles secured to the breaker unit for manually moving it on the rail extensions when the extensions are in the horizontal position, and spring biased manually releaable latch means disposed in the handles to enter said notches to control the movement of the breaker unit only when it is disengaged from the links.

16. In switchgear apparatus, in combination, a cell, a track having a fixed portion horizontally disposed in the cell and a hinged portion movable between vertical and horizontal positions, a circuit breaker unit mounted on the track, link means connected to the hinged portion of the track for moving the breaker unit between predetermined positions, tripping means for the circuit breaker, and an interlocking plate pivotally mounted in the cell, said link means actuating said interlocking plate to control the tripping of the circuit breaker by said tripping means.

17. In switchgear apparatus, in combination, a cell, a track having a fixed portion horizontally disposed in the cell and a hinged portion movable between vertical and horizontal positions, a circuit breaker unit mounted on the track, link means connected to the hinged portion of the track for moving the breaker unit between predetermined positions, tripping means for the circuit breaker, an interlocking plate pivotally mounted in the cell, and spring means for biasing the interlocking plate in one direction, said link means actuating the interlocking plate in the other direction to control the tripping of the circuit breaker by said tripping means.

18. In switchgear apparatus, in combination, a cell, a track having a fixed portion horizontally disposed in the cell and a hinged portion movable about a hinge pin between vertical and horizontal positions, a circuit breaker unit mounted on the track and movable horizontally into or out of the cell, actuating mechanism connected to the hinged portion of the track and releasably engaging the breaker unit to move it in either direction between predetermined positions on the fixed portion of the track, and manually releasable stop means for controlling the movement of the breaker unit on the hinged portion of the track.

19. In switchgear apparatus, in combination, a cell, a track having a fixed portion horizontally disposed in the cell and a hinged portion movable about a hinge pin between vertical and horizontal positions, a circuit breaker unit mounted on the track and movable horizontally into or out of the cell, actuating mechanism connected to the hinged portion of the track and releasably engaging the breaker unit to move it in either direction between predetermined positions on the fixed portion of the track, and spring-biased stop means releasably engaging the hinged portion of the track to control the movement of the breaker unit when it is on the hinged portion.

20. In switchgear apparatus, in combination, a cell, a track having a fixed portion horizontally disposed in the cell and a hinged portion movable about a hinge pin between vertical and horizontal positions, a circuit breaker unit mounted on the track and movable horizontally into or out of the cell, mechanism connected to the hinged portion of the track for moving the breaker unit in either direction between predetermined positions, said mechanism being automatically disengaged from the breaker unit when the hinged portion of the track is actuated to the horizontal position, and manually releasable stop means for controlling the movement of the breaker unit after disengagement of said mechanism.

References Cited in the file of this patent

UNITED STATES PATENTS

| | | |
|---|---|---|
| 1,610,069 | Weber | Dec. 7, 1926 |
| 2,127,060 | Hansen et al. | Aug. 16, 1938 |
| 2,128,149 | Linde | Aug. 23, 1938 |
| 2,258,150 | Scott | Oct. 7, 1941 |
| 2,391,460 | Howard | Dec. 25, 1945 |
| 2,412,931 | West | Dec. 17, 1946 |
| 2,443,669 | Tusing | June 22, 1948 |
| 2,514,246 | Knox | July 4, 1950 |
| 2,544,314 | Hebbel, Jr. | Mar. 6, 1951 |
| 2,563,441 | Wood et al. | Aug. 7, 1951 |